Oct. 5, 1926.
R. F. KNIGHT
1,602,077
LOCOMOTIVE BOOSTER APPARATUS
Filed Oct. 28, 1924  3 Sheets-Sheet 1
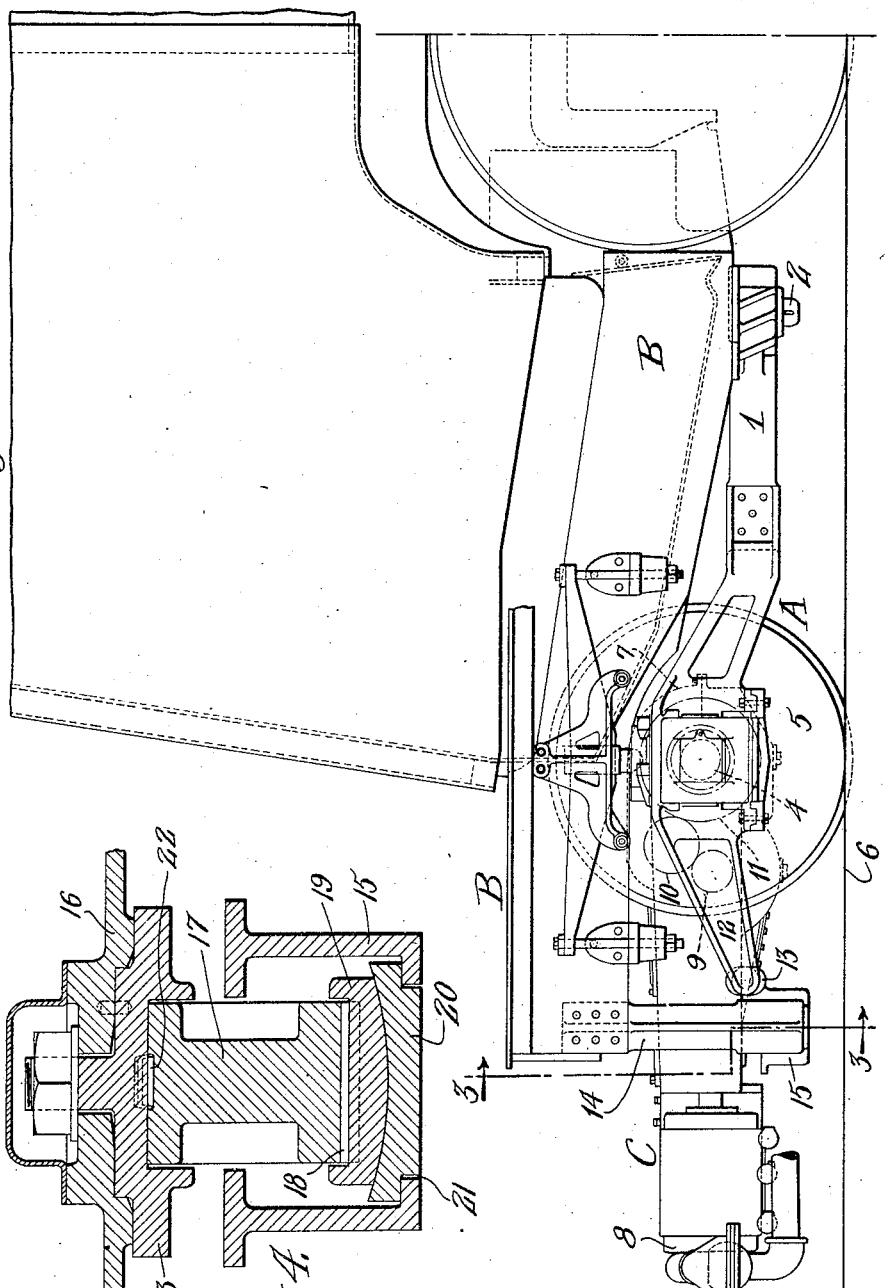
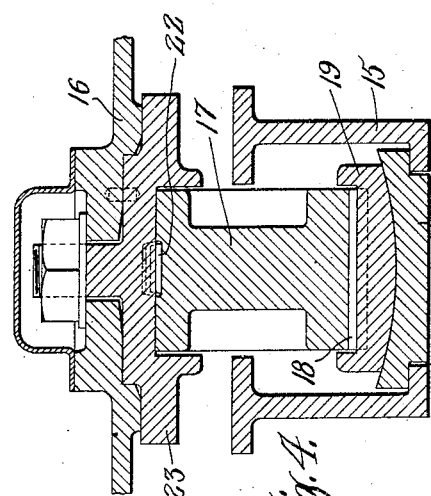
INVENTOR
Ronald F. Knight
ATTORNEYS

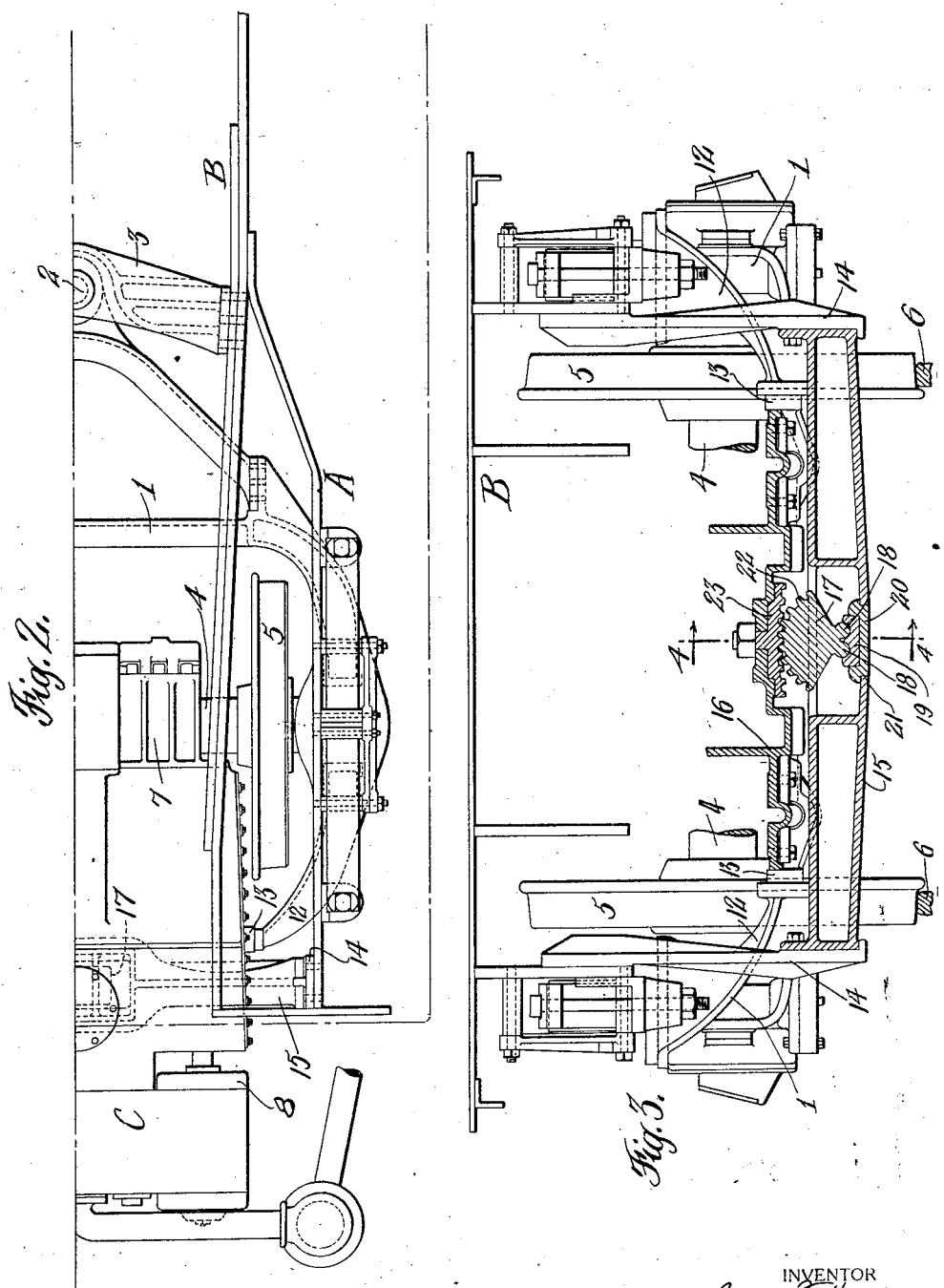

Oct. 5, 1926.  
R. F. KNIGHT  
1,602,077  
LOCOMOTIVE BOOSTER APPARATUS  
Filed Oct. 28, 1924   3 Sheets-Sheet 3
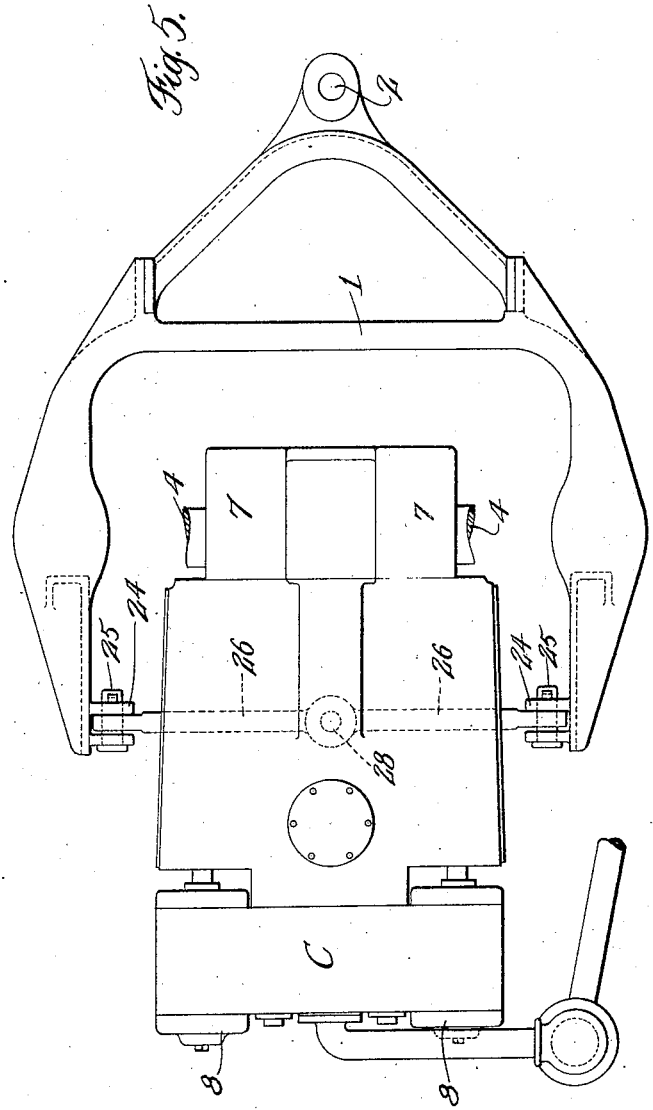
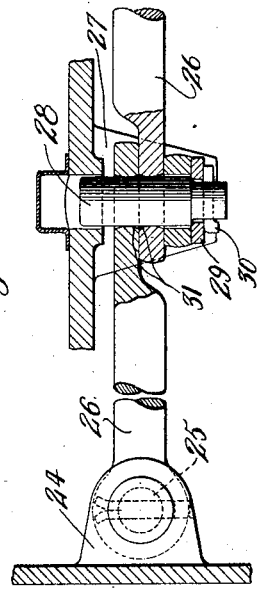
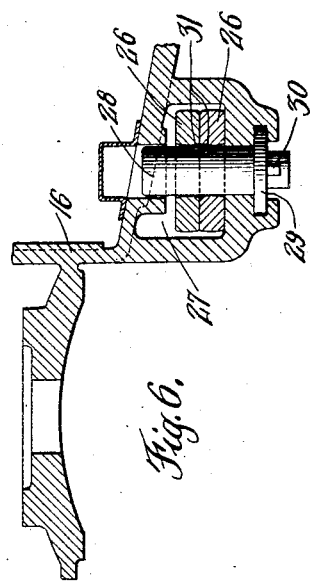
INVENTOR  
Ronald F. Knight  
BY  
ATTORNEYS Patented Oct. 5, 1926.

1,602,077

UNITED STATES PATENT OFFICE.

RONALD F. KNIGHT, OF RAMSEY, NEW JERSEY, ASSIGNOR TO FRANKLIN RAILWAY SUPPLY COMPANY, A CORPORATION OF DELAWARE.

LOCOMOTIVE-BOOSTER APPARATUS.

Application filed October 28, 1924. Serial No. 746,342.

This invention relates in general to locomotive boosters such as are used for the purpose of aiding or boosting the locomotive at slow speeds up heavy grades or when starting. It has particular reference to an improved means for supporting the booster motor.

Booster motors of the type herein illustrated are intended to drive an axle otherwise normally idle in so far as propulsion of the locomotive is concerned and my invention is primarily intended for use in connection with the axle of a locomotive trailer truck although it might be used in connection with any pivoted truck either on the locomotive or on the tender.

With the foregoing in mind the objects of the invention will be better understood. They are first, the provision of an improved means for suspending the booster motor which will relieve the associated structure of a large amount of strain especially while the locomotive is rounding curves; second, the provision of booster supporting structure which will maintain the booster in alignment with the pivoted truck while yet permitting up and down rocking movement of the booster around the axle which it drives; third, the provision of a supporting structure for the free end of the booster motor which is rigid with the main frame of the locomotive; and fourth, the provision of a centering means which will act to keep the booster and its associated parts in proper alignment.

The foregoing together with such other objects as may hereinafter appear or are incident to my invention I obtain by means of a construction which is illustrated in a preferred form in the accompanying drawings, wherein—

Fig. 1 is a partial side elevation of the rear end of a locomotive with its trailer truck having my improvements applied thereto; Fig. 2 is a half plan view of the trailer truck with its booster motor; Fig. 3 is a section approximately on the line 3—3 of Fig. 1; Fig. 4 is an enlarged section on the line 4—4 of Fig. 3; Fig. 5 is a partial plan view of the trailer truck with its booster illustrating a modification of the invention; and Figs. 6 and 7 are enlarged sections illustrating details of the arrangement shown in Fig. 5. In Fig. 3 a number of unnecessary parts are omitted for the sake of clearness in the illustration.

By referring to the drawings it will be seen that the frame 1 of the trailer truck A is pivoted at 2 to the cross member 3 of the main frame B of the locomotive. The axle 4 with its wheels 5 is carried in any approved or desired manner in the frame 1 of the trailer truck, it being understood, of course, that as the locomotive takes a turn in the track 6 the trailer truck A will be swung to one side or the other as the case may be.

The booster motor C is shown as usual mounted at its forward end on the axle 4 through the medium of the spaced bearings 7. These spaced bearings permit the rear end of the booster to move upwardly or downwardly to a slight extent as the axle 4 moves downwardly or upwardly over the rails.

The construction so far referred to is old and well known and is mentioned thus briefly merely for the sake of clarity in the disclosure. It might also be mentioned that the booster cylinders 8 are arranged to drive the axle 4 through the medium of suitable gears 9, 10 and 11 (see Fig. 1). The gear 9 is a pinion driven by the booster cylinders 8, the gear 11 is fixed to the axle 4 and the gear 10 is an idler gear always in mesh with the pinion 9 but capable of being moved into or out of engagement with the gear 11. This apparatus is in no way connected with the invention herein and will, therefore, not be described in greater detail.

It will therefore be seen that it is important to keep the booster motor in proper alignment with the axle. In other words the booster motor as a whole must be maintained in a fixed relation with respect to the axle and the truck frame in a direction transverse of the truck. To this end in the showing of Figs. 1 to 4 inclusive I provide the guide arms 12, one at either side of the booster, which extend rearwardly of the axle 4 and which are integral with the frame 1 and I arrange these arms to bear upon pillows 13, one at each side of the booster motor. As the truck swings the arms bear against the pillows 13 (one side functioning in one direction and the other in the other direction) and hold the free end of the booster C in its proper relation to the axle 4.

The rear or free end of the booster is supported in the following manner. A pair of arms 14, one at either side of the booster depend rigidly from the locomotive frame B. Extending between these two arms beneath the booster is a cross member 15 rigidly secured to such arms. This structure it will be noted forms a substantially U-shaped frame which is to all intends and purposes a part of the locomotive frame.

The portion of the booster immediately above this cross member 15 is formed into what is known as the booster bed plate 16 (see Fig. 3) between which and the cross member I locate a centering structure embodied in the present instance as a rocker 17. The rocker rests at the bottom upon a pair of spaced rocker supports 18 which are carried in a suitable pillow 19, the latter in turn being socketed in a member 20 fitted into an aperture 21 in the cross member 15. The upper face of the rocker 17 constitutes substantially the segment of a gear the teeth 22 of which mesh with the teeth on a plate 23 secured to the underside of the bed plate 16.

The rocker functions much in the manner common to rockers of this type so that when the rear end of the booster moves either to the right or to the left (see Fig. 3) as the locomotive takes a curve it will roll the rocker to one or the other of its rounded seats 18 thereby slightly lifting the free end of the booster and moving it upwardly around the axle 4. The weight of the booster will tend to bring the whole truck back to a central position since a pillow 13 will be pushing against an arm 12 and the arms 12 are a rigid part of the truck frame 1. This arrangement will to a great extent relieve the parts of strain and will also relieve the flanges of the wheels 5 with a consequent reduction in wear thereon as well as on the rail.

It will be seen that I have provided an arrangement for supporting the booster which makes use of the weight of the booster itself in helping to maintain the parts in proper alignment.

In Figs. 5, 6 and 7 I have illustrated a structure which dispenses with the arms 12 and employs in their stead a linkage connection between the sides of the trailer truck frame and the booster motor. An apertured lug 24 is provided near the rear of each side of the frame 1 in which is pivoted by means of a pin 25 a link 26, there being one link for each side of the booster. At approximately the center of the booster in a direction transverse thereof and on the underside of the bed plate 16 I have provided a socket or recess 27 into which the adjacent ends of the links 26 extend. A pin 28 is run up from below through a hole in the bottom of the socket 27 and through holes in the adjacent ends of the links, the pin being held in place by the washer 29 and key 30. The holes in the links are slightly enlarged and rounded as shown for instance at 31 so as to permit of the slight rocking or rolling movement due to the up and down motion of the booster.

By thus tying, so to speak, the booster motor to the frame 1 it is caused to move with the frame 1 whenever the locomotive takes a turn. It will be obvious, of course, that a single link might be extended all the way across between the side members of the frame 1 and the connection to the booster altered to suit.

I claim:

1. Locomotive booster apparatus comprising in combination with the frame of the locomotive, a truck frame with an axle and wheels pivoted to said locomotive frame, a booster motor mounted in a fixed relation to the truck in a direction transverse of the truck frame, means for supporting the booster from the locomotive frame, and a centering rocker between the booster and the supporting means.

2. In booster equipment for locomotive trailer trucks, the combination of a support for the booster rigid with the locomotive and a centering rocker between the booster and said support.

3. Locomotive booster apparatus comprising in combination with the frame of the locomotive, a truck frame with an axle and wheels pivoted to said locomotive frame, a booster motor mounted for vertical rocking on the axle, means for maintaining the booster in alignment with the axle, means for supporting the booster from the locomotive frame, and a centering rocker between the booster and the supporting means.

4. Locomotive booster apparatus comprising in combination with the frame of the locomotive, a truck frame with an axle and wheels pivoted to said locomotive frame, a booster motor mounted to swing with the truck frame, means for supporting the booster from the locomotive frame, and a centering rocker between the booster and the supporting means.

5. In booster equipment for locomotive trailer trucks, the combination of a support for the booster rigid with the locomotive and means for permitting the booster to ride on said support as the truck swings.

6. In booster equipment for locomotive trailer trucks, the combination of a support for the bootser fixed with respect to the locomotive but permitting the booster to move transversely thereto as the truck swings.

7. Locomotive booster equipment for pivoted trucks comprising in combination, with the vehicle supported by the truck, a booster motor and a support therefor fixed with respect to the vehicle but permitting the booster to move transversely thereof as the truck swings.

8. Locomotive booster equipment for pivoted trucks comprising in combination with the vehicle supported by the truck, a booster motor, a support therefor fixed with respect to the vehicle, and a centering rocker between the booster and said support.

9. Locomotive booster apparatus comprising in combination with the frame of the locomotive, a truck frame with an axle and wheels pivoted to said locomotive frame, a booster motor having one end pivotally mounted on the axle so as to give the other end up and down movement about said axle, means for maintaining the booster in alignment with the axle in a direction transverse of the truck frame, a support for the free end of the booster rigid with the locomotive frame, and a centering rocker between the booster and the support.

10. Locomotive booster equipment adapted to be applied to a locomotive trailer truck, comprising in combination with the frame of the locomotive, a supporting arm at each side of the truck rigidly secured to the frame, a transverse supporting member rigid with said arms, and a booster motor mounted and maintained in the truck in such a way as will cause it to ride across and yet be supported on said supporting member.

In testimony whereof I have hereunto signed my name.

RONALD F. KNIGHT.